United States Patent
Jiang

(10) Patent No.: US 11,022,532 B2
(45) Date of Patent: Jun. 1, 2021

(54) PRESSURE AND HARDNESS TESTER OF PLANAR TEST PIECE

(71) Applicant: Wuhan China Star Optoelectronics Semiconductor Display Technology Co., Ltd., Hubei (CN)

(72) Inventor: Guodong Jiang, Guangdong (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 260 days.

(21) Appl. No.: 16/024,187

(22) Filed: Jun. 29, 2018

(65) Prior Publication Data

US 2019/0178766 A1    Jun. 13, 2019

Related U.S. Application Data

(63) Continuation of application No. PCT/CN2018/076342, filed on Feb. 11, 2018.

(30) Foreign Application Priority Data

Dec. 8, 2017    (CN) .......................... 201711297317.6

(51) Int. Cl.
    *G01N 3/40*    (2006.01)
    *G01N 3/42*    (2006.01)

(52) U.S. Cl.
    CPC ................ *G01N 3/40* (2013.01); *G01N 3/42* (2013.01); *G01N 2203/0087* (2013.01);
    (Continued)

(58) Field of Classification Search
    CPC .......................................................... G01N 3/40
    (Continued)

(56) References Cited

U.S. PATENT DOCUMENTS

| 4,899,577 A | * | 2/1990 | Fischer | .................... G01N 3/42 73/82 |
| 5,027,650 A | | 7/1991 | Oblas et al. | |

(Continued)

FOREIGN PATENT DOCUMENTS

| CN | 2589966 Y | 12/2003 |
| CN | 101089590 A | 12/2007 |

(Continued)

OTHER PUBLICATIONS

Shi. Translation of CN104729937. Published Jun. 2015. Translated Apr. 2020. (Year: 2015).*

(Continued)

*Primary Examiner* — Walter L Lindsay, Jr.
*Assistant Examiner* — Philipmarcus T Fadul
(74) *Attorney, Agent, or Firm* — Leong C. Lei

(57) ABSTRACT

Discloses is a pressure and hardness tester of a planar material, comprising a base, a stage, a test frame and a test device. The test piece is flatly extended and fixed on the stage. The test frame comprises a floor stand and a cross bar hinged by a rotating shaft. The floor stand and the stage are fixedly connected with the base. One end of the cross bar is provided with a balance weight and the other end of the cross bar is provided with a counterweight and a connecting part. The connecting part is used to connect the test device including a pressure test assembly or a hardness test assembly and make the test device right opposite to the stage. After the cross bar rotates about the rotating shaft, the test device contacts with the test piece for testing a pressure resistance or a hardness of the test piece.

6 Claims, 4 Drawing Sheets

(52) U.S. Cl.
CPC ............... *G01N 2203/0202* (2013.01); *G01N 2203/0282* (2013.01); *G01N 2203/04* (2013.01)

(58) Field of Classification Search
USPC ........................................... 73/78
See application file for complete search history.

(56) References Cited

U.S. PATENT DOCUMENTS

| | | | | |
|---|---|---|---|---|
| 5,804,706 A | * | 9/1998 | Williston | ............... G01N 3/56 73/7 |
| 2015/0323436 A1 | * | 11/2015 | Hansma | ............... G01N 3/04 73/12.09 |

FOREIGN PATENT DOCUMENTS

| | | |
|---|---|---|
| CN | 104729937 A | 6/2015 |
| CN | 205175816 U | 4/2016 |
| CN | 106053205 A | 10/2016 |
| KR | 20140035589 A | 3/2014 |

OTHER PUBLICATIONS

Shiyu. Translation of CN2589966. Published Dec. 2003. Translated Apr. 2020. (Year: 2003).*

* cited by examiner

PRESSURE AND HARDNESS TESTER OF PLANAR TEST PIECE

CROSS-REFERENCE TO RELATED APPLICATION

This application is a continuing application of PCT Patent Application No. PCT/CN2018/076342 entitled "Tester", filed on Feb. 11, 2018, which claims priority to Chinese Patent Application No. 201711297317.6, filed on Dec. 8, 2017, both of which are hereby incorporated in its entireties by reference.

FIELD OF THE INVENTION

The present invention relates to a display screen manufacturing field, and more particularly to a pressure and hardness tester of a planar material.

BACKGROUND OF THE INVENTION

In the display manufacturing process, a pencil hardness is a commonly used index for detecting the performance of a display screen. The test pencil tests the hardness of the display screen or material by contacting with the test display screen or the material of the display screen. It can be understood that the material for preparing the display screen is a planar material.

With the continuous presentation of flexible OLED displays, the commonly used pencil hardness and other indexes in the industry cannot fully meet the performance description of flexible OLED displays. Therefore, for the characteristics of flexible screens or the planar materials used to prepare flexible screens, the industry has introduced a series of parameters, such as a pressure resistance index and a bending-proof index on the basis of hardness and other commonly used indexes to test the performance of flexible planar materials. For the tests of these newly introduced performance indexes, it is usually necessary to add targeted test equipments for the solution. A tester can only be used for one corresponding performance parameter, which may easily lead to stacking and waste of the test equipments.

SUMMARY OF THE INVENTION

An object of the present invention is to provide a tester capable of measuring pressure and hardness parameters of a planar material, which specifically comprises a following technical solution:

Disclosed is a tester, used for a performance test of a planar test piece. The test comprises a base, a stage, a test frame and a test device; the test frame and the stage are disposed on the base, and the test device is disposed on the test frame, and the test piece is flatly extended and fixed on the stage: the test frame comprises a floor stand and a cross bar hinged by a rotating shaft, and the floor stand is fixedly connected with the base, and a first end of the cross bar is provided with a balance weight and a second end of the cross bar is connected with a connecting part, and a counterweight is further arranged on the connecting part, and the connecting part is used to connect the test device and make the test device right opposite to the stage, and as the cross bar rotates about the rotating shaft, the test device is in contact with the test piece for testing; the test device is various and comprises a pressure test assembly or a hardness test assembly, and the connecting part is connected with the pressure test assembly or the hardness test assembly to test a pressure resistance or a hardness of the test piece.

The pressure test assembly comprises a setting rod and a pressure measuring head, and the connecting part is provided with a pressure measuring hole matched with the setting rod, and the pressure measuring head is located between the setting rod and the test piece and fixed on the setting rod for contacting with the test piece.

The pressure measuring hole is a through hole, and the setting rod passes through the pressure measuring hole, and the counterweight passes through the setting rod and is disposed on the connecting part.

The setting rod is provided with threads, and the counterweight is pressed by a nut matched with the setting rod.

The hardness assembly is a test pencil, and the connecting part is provided with a hardness hole matched with the test pencil, and a tip of the test pencil is located between the connecting part and the test piece for contacting with the test piece.

A threaded through hole is provided on a side wall of the hardness hole, and a screw is inserted into the threaded through hole for adjustment of clamping or loosening the test pencil.

The stage and the base are connected by a slide rail, and the slide rail is parallel to the cross bar and is used for adjusting a contact position of the stage with respect to the test device along a longitudinal direction of the cross bar.

An adjustment knob is disposed on the stage, and the adjustment knob is connected with a rotation displacement device, and the rotation displacement device adjusts a displacement of the stage along the sliding rail relative to the test device through rotation.

The cross bar is further provided with a limiting device on the first end, and the limiting device comprises an abutting rod and a fixing part, and the fixing part is fixedly connected with the floor stand, and an abutment surface of the abutting rod resists the first end, and the abutting rod slides relative to the fixing part to control rotation of the cross bar.

A horizontal gauge is provided on the cross bar for leveling the cross bar.

In the tester of the invention, the stage and the floor stand are fixed on the base. The cross bar is rotatably connected to the floor stand with the rotating shaft. A balance weight is arranged on the cross bar for leveling and a counterweight weight is further arranged for providing the weight required for the test. The connecting part can drive the connected test device to contact with the test piece under the support of the cross bar. When the test device is a pressure measuring assembly, the tester can measure the pressure resistance of the test piece. When the test device is a hardness component, the tester can measure the hardness of the test piece. By realizing the tests of two properties of the planar material on the same instrument, the scope of application of the tester is expanded to save the cost under the premise of ensuring the test reliability.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
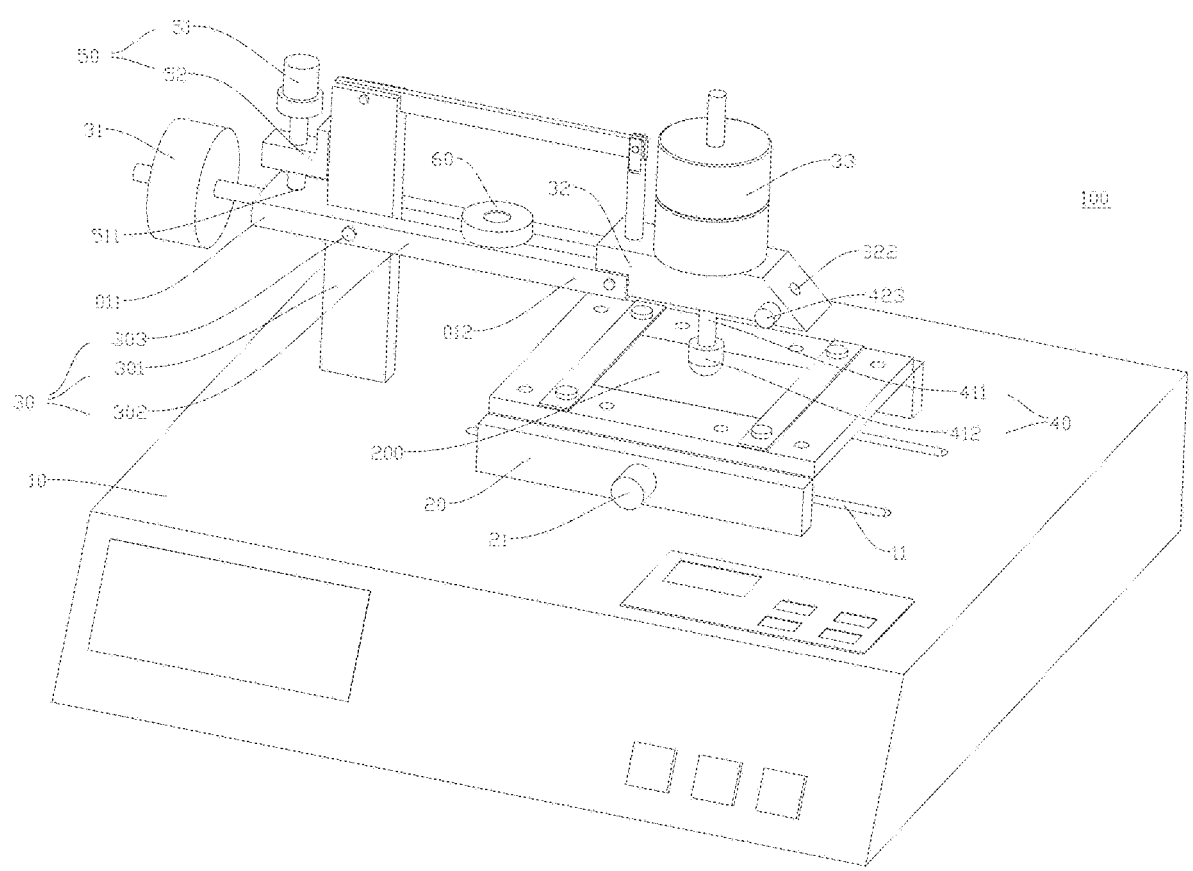
FIG. 1 is a diagram of an embodiment of a tester according to the present invention.

Please refer to the test 100 of FIG. 1, comprising a base 10, a stage 20, a test frame 30 and a test device 40. The test frame 30 comprises a floor stand 301 and a cross bar 302. Both the floor stand 301 and the stage 20 are arranged on the base 10. The floor stand 301 is preferably perpendicular to the base 10, and the stage 20 is preferably parallel to a top surface of the base 10. The floor stand 301 is hinged with the cross bar 302 by a rotating shaft 303. Relative to the rotating shaft 303, the end of the cross bar 302 away from the stage 20 is the first end 011 and the other end is the second end 012. The first end 011 is provided with an adjustable balance weight 31. The balance weight 31 can be moved along the longitudinal direction of the cross bar 302 relative to the rotating shaft 303 to change the center of gravity of the cross bar 302, thereby adjusting the initial leveling state of the cross bar 302 so as to start the subsequent test operation. The second end 02 is provided with a connecting part 32. The connecting part 32 is used to connect the test device 40. The connecting part 32 is also provided with a counterweight 33.

The test device 40 can be various for kinds of testing purposes and comprise a pressure test assembly 41 or a hardness test assembly 42. The pressure test assembly 41 and the hardness test assembly 42 can be separately connected on the connecting part 32. It can be understood that when the connecting part 32 is connected to the pressure test assembly 41, the tester 100 is used to test the pressure resistance of the test piece 200; when the connecting part 32 is connected to the hardness test assembly 42, the tester 100 is used to test the hardness of the test piece 200.

The test piece 200 is a planar material and is tiled on the stage 20. The cross bar 302 can be rotated about the rotating shaft 303 by being hinged with the floor stand 301. When the second end 012 of the cross bar 302 is rotated toward the stage 20, the test device 40 driven by the connecting part 32 is moved right opposite to the stage 20, and the position where test device 40 and the stage 20 are in contact with each other is on the test piece 200. As using the tester 100 of the present invention, it is necessary to first fix the test device 40 corresponding to the test item on the connecting part 32, and then to adjust the balance weight 31 to make the cross bar 302 in a leveled state. Finally, the counterweight 33 is placed, to control the second end 012 of the cross bar 302 to rotate toward the stage 20, so that the test device 40 is in contact with the test piece 200.

The tester 100 of the present invention achieves the relative movement and contact of the test device 40 relative to the test piece 200 with the cooperation of the stage 20, the test frame 30 and the test device 40. The counterweight 33 provides the required weight of the test device 40 during testing. The inspector can equip the corresponding test device 40 with an index that needs to be tested. The two tests for the two performance indexes of the planar material can be implemented on the same tester expands the compatibility of the tester 100 and saves costs.

It can be understood that the inspector can also utilize the tester 100 of the present invention to apply some conventional components to establish the test device 40 according to the test requirements of the planar materials or to apply some conventional test methods to realize the testing function of the tester 100 for other general indexes of the planar material.

In one embodiment, the test device 40 is the pressure test assembly 41, comprising a setting rod 411 and a pressure measuring head 412. The setting rod 411 is matched with a pressure measuring hole 321 arranged on the connecting part 32 to be fixed on the connecting part 32. The matching can be a threaded matching, an interference matching or a snap-matching with spring extension. The present invention has no specific limitations as long as the setting rod 411 does not move axially with respect to the connecting part 32 and the effect of the present invention can be achieved. Preferably, the setting rod 411 does not rotate in the axial direction relative to the connecting part 32 and is completely fixed on the connecting part 32. The pressure measuring head 412 is disposed between the setting rod 411 and the test piece 200 and is fixed on the setting rod 411. After the cross bar 302 rotates relative to the test piece 200, the pressure measuring head 412 comes into contact with the test piece 200. At this time, the weight of the counterweight 33 is fully loaded on the test piece 200, and the weight of the cross bar 302 and the connecting part 32 is offset by the balance weight 31. Namely, the test piece 200 bears the total weight of the counterweight 33. After the pressure measuring head 412 is in contact with the test piece 200 for a certain period of time, the inspector can judge the pressure resistance of the test piece 200 by checking whether a depression occurs to the test piece 200.

Figure 2:
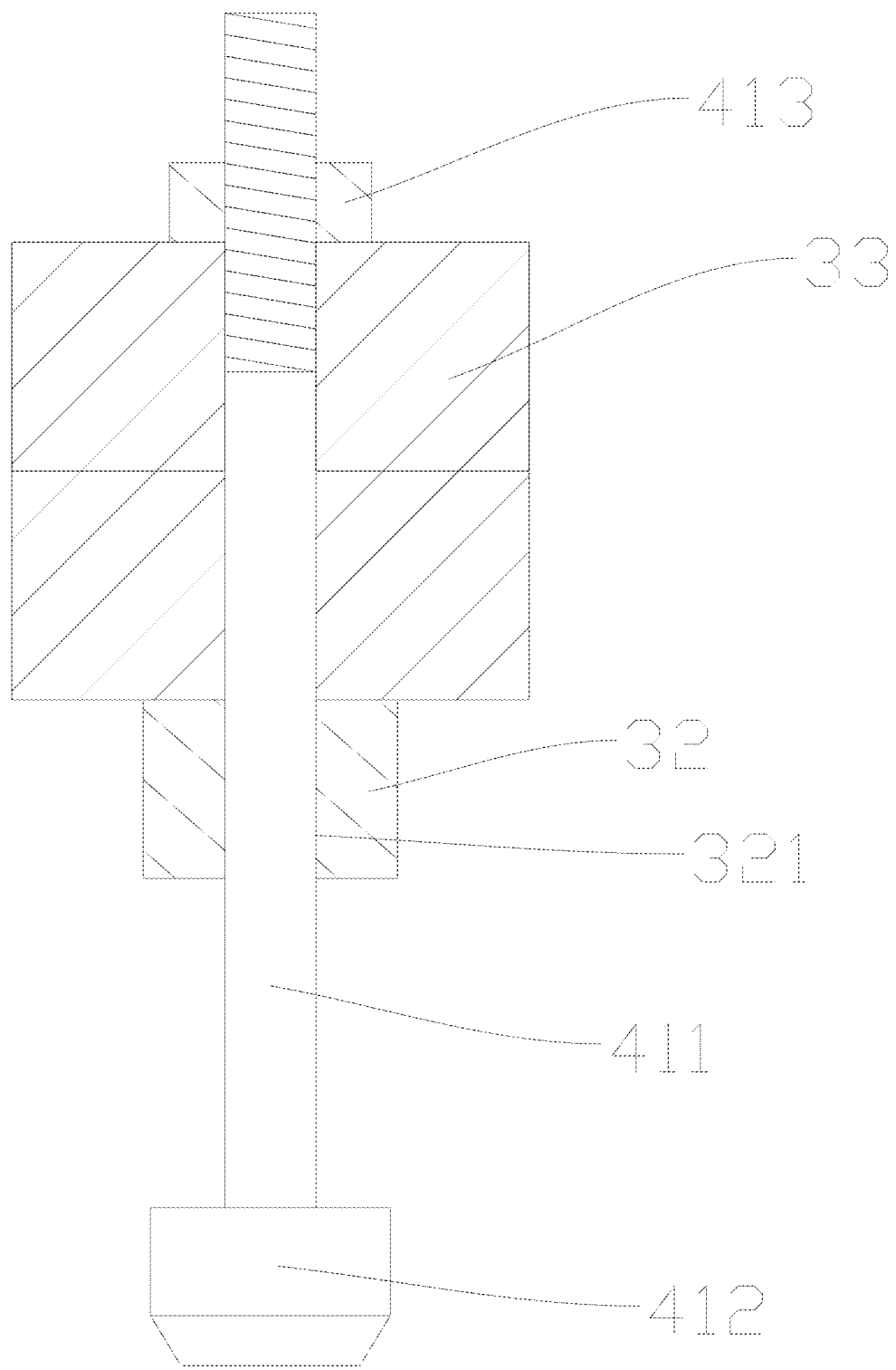
FIG. 2 is a partial diagram of an embodiment of a tester according to the present invention.

In one embodiment, as shown in FIG. 2, the pressure measuring hole 321 is a through hole and the setting rod 411 passes through the pressure measuring hole 321, i.e. the setting rod 411 passes through the connecting part 32. At the opposite side of the pressure measuring head 412 to the connecting part 32, the setting rod 411 passes through the counterweight 33 to connect the counterweight 33 with the connecting part 32. It can be understood that the counterweight 33 has a through hole 331 formed therein for the setting rod 411 to pass through. It can be understood that the counterweight 33 passes through the setting rod 411 and is connected to the connecting part 32 to ensure that the counterweight 33 and the pressure test assembly 41 are at the same arm distance with respect to the connecting shaft 33. The weight of the counterweight 33 loaded on the pressure test assembly 41 can be converted into a gravity value by a simple 1:1 conversion, which facilitates the test data processing of the tester 100 according to the present invention and also reduces the numerical error due to the conversion.

Furthermore, the setting rod 411 is threaded on one end facing the counterweight 33. The inspector may use a nut 413 to screw into the setting rod 411 to compress the counterweight 33 for preventing the counterweight 33 from flicking back and forth along the setting rod 411 during the back and forth rotation of the cross bar 302. It can be understood that the internal thread of the nut 413 and the threads of the setting rod 411 cooperate with each other.

Figure 3:
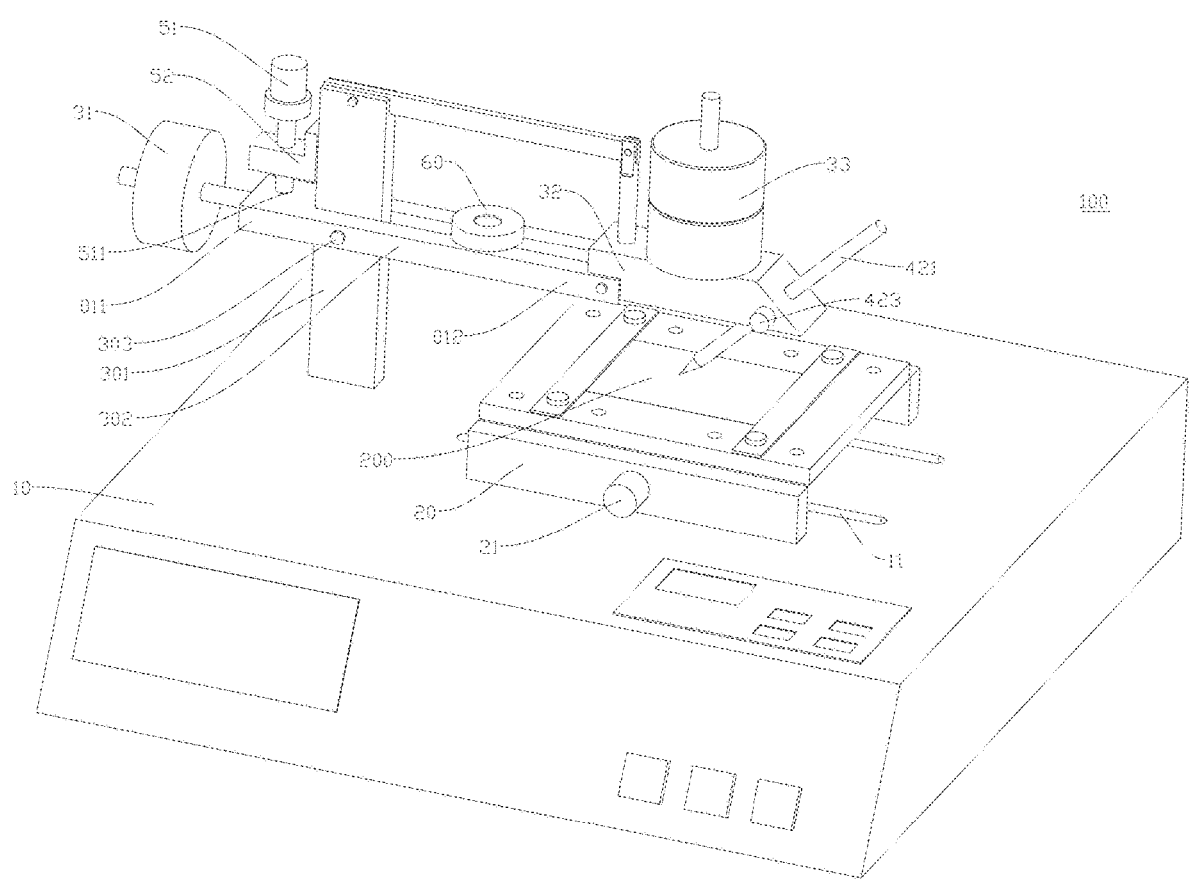
FIG. 3 is a diagram of another embodiment of a tester according to the present invention.

When the test device 40 is the hardness test assembly 42, referring to FIG. 3, the hardness test assembly 42 can be directly implemented with a common test pencil 421. The test pencil 421 can be a combination of various hardness formations, such as common hardness values of 2B and HB. The connecting part 32 is provided with a hardness hole 322 matched with the test pencil 421. The test pencil 421 is fixed on the connecting part 32 through the hardness hole 322. A tip of the test pencil 321 is located between the connecting part 32 and the test piece 200. After the cross bar 302 is rotated about the rotation shaft 303, the connecting part 32 is driven to move towards the stage 20, the test pencil 321 comes into contact with the test piece 200. At this time, the weight of the counterweight 33 is fully loaded on the test piece 200, and the weight of the cross bar 302 and the connecting part 32 is offset by the balance weight 31. Namely, the test piece 200 bears the total weight of the counterweight 33. The total weight is transferred to the test piece 200 through the test pencil 321 for hardness test. It can be understood that the hardness hole 322 is a through hole.

Figure 4:
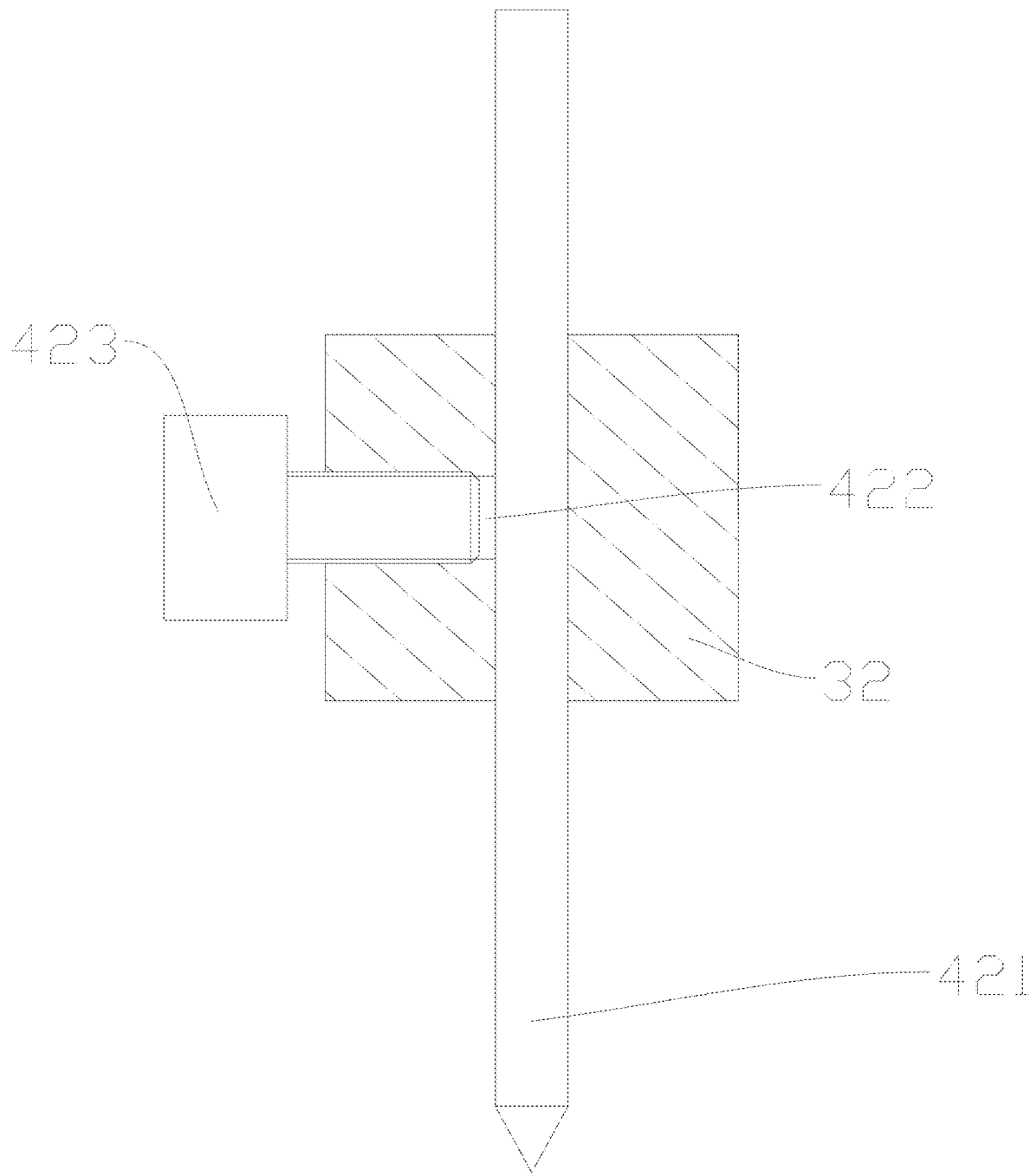
FIG. 4 is a partial diagram of another embodiment of a tester according to the present invention.

Further, referring to FIG. 4, a threaded through hole 422 is provided on a side wall of the hardness hole 421. The threaded through hole 422 is perpendicular to the hardness hole 421 and penetrates through one side wall of the hardness hole 421. The threaded through hole 422 is used to be screwed with a screw 423. After the screw 423 is inserted into the threaded through hole 422, the threaded through hole 422, the screw can abut with a pen body of the test pencil 421 so as to achieve clamping or loosening the test pencil for extracting or loading the test pencil 421 and adjusting the length of the test pencil 421 relative to the test piece 200.

In one embodiment, a slide rail 11 is disposed between the stage 20 and the base 10. The stage 20 is connected to the base 10 via the slide rail 11. The slide rail 11 is preferably configured to be parallel with the cross bar 302. Specifically, the slide rail is parallel to the longitudinal direction of the cross bar 302, the stage 20 is on the slide rail 11 and moved along the slide rail 11. Namely, the test piece 200 disposed on the stage 20 is moved relative to the cross bar 302, and the position of the test device 40 connected to the cross bar 302 contacting the test piece 200 changes. The function that the tester 100 of the present invention performs test on multiple parts of the same test piece 200 can be achieved to avoid the defects that a certain point of the test piece cannot be tested due to the abrupt change or non-uniform quality of the indexes. On the other hand, the stage 20 slides relative to the base 10 with the slide rails 11. Namely, the test piece 200 is driven in the testing process to slide relative to the test pencil 421 so that the inspector can conveniently observe the test piece 200, of which the test is accomplished and can check whether the test piece 200 is left with non-wipeable scratches to determine the hardness of the test piece. Preferably, the sliding distance of the test piece 200 is taken as 10 mm, which can provide sufficient observation length, and does not damage the test piece 200 in an over large area.

For the movement of the stage 20 relative to the slide rail 11, in some embodiments, an adjustment knob 21 is disposed on the stage 20. The adjustment knob 21 is connected with a rotary displacement device (not shown in figures), and the rotary displacement device can realize the displacement of the stage 20 with respect to the slide rail 11 by rotation. There are many mechanisms that can achieve this function, including a rack on the slide rail 11. A gear matched with the rack is disposed on the adjustment knob 21 to realize the displacement of the stage 20 by turning the adjustment knob 21. For another example, the adjustment knob 21 is connected with a friction wheel. The friction wheel utilizes the rolling friction with the surface of the slide rail 11 or the base 10 to drive the stage 20 to move. For another example, the rotary displacement device is a transmission belt or a chain connected to the stage 20. The adjustment knob 21 is connected to a transmission wheel on the transmission belt or a transmission wheel on the chain. The rotation of the adjustment knob 21 can also adjust the displacement of the stage 20 along the slide rail 11 relative to the test device 40.

In one embodiment, the cross bar 302 is further provided with a limiting device 50 on the first end 011. The limiting device 50 comprises an abutting rod 51 and a fixing part 52. The fixing part 52 is fixedly connected with the floor stand 301. An abutment surface 511 of the abutting rod 51 resists the first end 011. The abutting rod 51 is telescopically slidable relative to the fixing part 52, and is used for limiting the rotation of the test device 40 toward the stage 20 driven by the cross bar 302. Since most materials of the test device 40 are hard materials, such as metal, the weight provided by the counterweight 33 is supplemented during the test. When the test device 40 is in contact with the test piece 200, the test device 40 possesses a large speed and an impact force, thereby possibly damaging the test piece 200. Further, some test items do not require the test device 40 to have the initial velocity. Therefore, the abutting rod 51 sliding relative to the fixed part 52, i.e., sliding relative to the floor stand 301 is disposed to provide the abutting surface 511 to control the rotating speed of the cross bar 302 in the rotation thereof.

It can be understood that the limiting device 50 may limit only the rotation of the second end 012 of the cross bar 302 toward the stage 20 in a single direction, and may also provide two opposite abutting surfaces 511 to control the rotation of the cross bar 302 in two directions at the same time. It can be understood that the limit device 50 may be manually controlled or may be electrically controlled by the motor. It can be understood that as the weight of the counterweight 33 is too large or the test item has special requirements on the initial velocity of the test device 40, the manual control of the limit device 50 is not suitable and the motor driving is more stable and reliable.

The leveled cross bar 302 is a test accuracy reference of the tester 100 of the present invention. In one embodiment, in order to monitor whether the leveled state of the balance weight 31 relative to the cross bar 302 meets the standard, a horizontal gauge 60 is provided on the cross bar 302. The horizontal gauge 60 is used to reflect the leveled state of the cross bar 302 during the leveling process of the cross bar 302. The leveled cross bar 302 can improve the test accuracy of the tester 100 of the present invention and avoid error interference.

It can be understood that on the basis of the tester 100 of the present invention, some sensors may also be provided for sensing the feedback value of the test piece 200. Further, a control system and/or a display system are provided on the base 10 to help the inspector to control the tester 100 more intuitively and quickly and to read the test result data. These general settings are not particularly limited in the present invention.

With the cooperation of the stage 20, the test frame 30 and the test device 40, and particularly with the arrangement of various test assemblies of the test device 40, the tester 100 of the present invention achieves the objective that two tests for the two performance indexes of the planar material can be implemented on the same tester to expand the compatibility of the tester 100 and to save costs. Furthermore, the two embodiments of the test device 40 are optimized and designed so that the test process is more controllable and the test result is more accurate. The accuracy and reliability of the tester 100 are improved.

Above are embodiments of the present invention, which does not limit the scope of the present invention. Any modifications, equivalent replacements or improvements within the spirit and principles of the embodiment described above should be covered by the protected scope of the invention.

What is claimed is:

1. A tester, used for a performance test of a planar test piece, wherein the tester comprises a base, a stage, a test frame and a test device;

the test frame and the stage are disposed on the base, and the test device is disposed on the test frame, and the test piece is flatly extended and fixed on the stage;

the test frame comprises a floor stand and a cross bar hinged by a rotating shaft, and the floor stand is fixedly connected with the base, and a first end of the cross bar is provided with a balance weight and a second end of the cross bar is connected with a connecting part, and a counterweight is further arranged on the connecting part, and the connecting part is used to connect the test device and make the test device right opposite to the stage, and as the cross bar rotates about the rotating shaft, the test device is in contact with the test piece for testing;

the test device is various and comprises a pressure test assembly or a hardness test assembly, and the connecting part is connected with the pressure test assembly or the hardness test assembly to test a pressure resistance or a hardness of the test piece;

wherein the pressure test assembly comprises a setting rod and a pressure measuring head, and the connecting part is provided with a pressure measuring hole matched with the setting rod, and the pressure measuring head is located between the setting rod and the test piece and fixed on the setting rod for contacting with the test piece;

wherein the pressure measuring hole is a through hole, and the setting rod passes through the pressure measuring hole and the counterweight, and the counterweight is disposed on the connecting part by the setting rod;

wherein the hardness assembly is a test pencil, and the connecting part is provided with a hardness hole matched with the test pencil, and a tip of the test pencil is located between the connecting part and the test piece for contacting with the test piece;

wherein a threaded through hole is provided on a side wall of the hardness hole, and a screw is inserted into the threaded through hole for adjustment of clamping or loosening the test pencil.

2. The tester according to claim 1, wherein the setting rod is provided with threads, and the counterweight is pressed by a nut matched with the setting rod.

3. The tester according to claim 1, wherein the stage and the base are connected by a slide rail, and the slide rail is parallel to the cross bar and is used for adjusting a contact position of the stage with respect to the test device along a longitudinal direction of the cross bar.

4. The tester according to claim 3, wherein an adjustment knob is disposed on the stage, and the adjustment knob is connected with a rotation displacement device, and the rotation displacement device adjusts a displacement of the stage along the sliding rail relative to the test device through rotation.

5. The tester according to claim 1, wherein the cross bar is further provided with a limiting device on the first end, and the limiting device comprises an abutting rod and a fixing part, and the fixing part is fixedly connected with the floor stand, and an abutment surface of the abutting rod resists the first end, and the abutting rod slides relative to the fixing part to control rotation of the cross bar.

6. The tester according to claim 5, wherein a horizontal gauge is provided on the cross bar for leveling the cross bar.

* * * * *